US012646795B2

(12) United States Patent
Lee et al.

(10) Patent No.:     US 12,646,795 B2
(45) Date of Patent:        Jun. 2, 2026

(54) BATTERY DEVICE

(71) Applicant: SK On Co., Ltd., Seoul (KR)

(72) Inventors: Kang Gu Lee, Daejeon (KR); Hae Ryong Jeon, Daejeon (KR); Jun Hee Jung, Daejeon (KR)

(73) Assignee: SK On Co., Ltd., Seoul (KR)

( * ) Notice: Subject to any disclaimer, the term of this patent is extended or adjusted under 35 U.S.C. 154(b) by 701 days.

(21) Appl. No.: 18/093,818

(22) Filed: Jan. 6, 2023

(65) Prior Publication Data

US 2023/0223646 A1     Jul. 13, 2023

(30) Foreign Application Priority Data

Jan. 12, 2022     (KR) ........................ 10-2022-0004830

(51) Int. Cl.
*H01M 50/367* (2021.01)
*H01M 50/211* (2021.01)
*H01M 50/271* (2021.01)
*H01M 50/383* (2021.01)

(52) U.S. Cl.
CPC ....... *H01M 50/367* (2021.01); *H01M 50/211* (2021.01); *H01M 50/271* (2021.01); *H01M 50/383* (2021.01); *H01M 2200/00* (2013.01)

(58) Field of Classification Search
CPC ............. H01M 50/367; H01M 50/211; H01M 50/271; H01M 50/383; H01M 2200/00; H01M 50/204; H01M 50/24; Y02E 60/10; A62C 3/16
See application file for complete search history.

(56) References Cited

U.S. PATENT DOCUMENTS

| 8,268,469 | B2 | 9/2012 | Hermann et al. | |
| 11,605,861 | B2 | 3/2023 | Rhee et al. | |
| 2012/0164490 | A1* | 6/2012 | Itoi ..................... | H01M 50/358 |
| | | | | 429/82 |

(Continued)

FOREIGN PATENT DOCUMENTS

| CN | 112151699 A | 12/2020 |
| CN | 112366400 A | 2/2021 |

(Continued)

OTHER PUBLICATIONS

Extended European Search Report on the European Patent Application No. 23150773.2 issued by the European Patent Office on May 31, 2023.

(Continued)

*Primary Examiner* — Matthew T Martin
*Assistant Examiner* — Bartholomew A Hornsby
(74) *Attorney, Agent, or Firm* — IP & T GROUP LLP

(57)        ABSTRACT

A battery device includes a cell assembly having a plurality of battery cells, and a frame member having a bottom member, a cover member, and a side member connecting the bottom member and the cover member to form as accommodating space for accommodating at least one cell assembly therein. The frame member comprises a flow space therein so that the pas or flames generated in the cell assembly flow, the flow space comprises a first flow space formed in any one of the cover member and the bottom member and a second flow space formed in the side member, and the first flow space and the second flow space are connected to each other.

19 Claims, 13 Drawing Sheets

(56) References Cited

U.S. PATENT DOCUMENTS

| | | | | |
|---|---|---|---|---|
| 2012/0288738 A1* | 11/2012 | Yasui | ................. | H01M 50/213 |
| | | | | 429/82 |
| 2014/0205878 A1 | 7/2014 | Ohgitani et al. | | |
| 2016/0248061 A1* | 8/2016 | Brambrink | ............. | B60L 50/66 |
| 2018/0108892 A1* | 4/2018 | Kim | ................... | H01M 50/367 |
| 2019/0097192 A1* | 3/2019 | Kim | ................... | H01M 50/394 |
| 2021/0280937 A1 | 9/2021 | Rhee et al. | | |
| 2021/0320364 A1 | 10/2021 | Rhee et al. | | |

FOREIGN PATENT DOCUMENTS

| | | |
|---|---|---|
| CN | 214254574 U | 9/2021 |
| JP | 2016-035817 A | 3/2016 |
| KR | 10-2012-0090027 A | 8/2012 |
| KR | 10-2017-0090261 A | 8/2017 |
| KR | 10-2019-0036260 A | 4/2019 |
| KR | 10-2021-0112645 A | 9/2021 |
| KR | 10-2021-0125177 A | 10/2021 |

OTHER PUBLICATIONS

Office Action for Korean Patent Application No. 10-2022-0004830 issued by the Korean Intellectual Property Office (KIPO) on Aug. 29, 2025.

* cited by examiner

II–II'

BATTERY DEVICE

CROSS-REFERENCE TO RELATED APPLICATION(S)

This application claims benefit of priority to Korean Patent Application No. 10-2022-0004830 filed on Jan. 12, 2022 in the Korean Intellectual Property Office, the disclosure of which is incorporated herein by reference in its entirety.

TECHNICAL FIELD

The present disclosure relates to a battery device having a plurality of battery cells including secondary batteries, and more particularly, to a battery device having a flow space through which gas generated in a battery cell is discharged externally.

BACKGROUND

Unlike primary batteries, secondary batteries may be charged and discharged, and may thus be applied to devices within various fields such as digital cameras, mobile phones, notebook computers, hybrid vehicles, and electric vehicles. Examples of secondary batteries include a nickel-cadmium battery, a nickel-metal hydride battery, a nickel-hydrogen battery, a lithium battery, and the like.

Such a secondary battery is manufactured with a pouch-type battery cell having flexibility or a prismatic or cylindrical can-type battery cell having rigidity, and is used by electrically connecting a plurality of battery cells. In this case, a plurality of battery cells may be stacked to form a cell stack (a cell assembly), and is disposed inside a frame to constitute a batter device such as a battery module or a battery back.

On the other hand, in the case of various events such as cases in which the lifespan of a battery cell approaches the end point, a swelling phenomenon may occur in the battery cell, overcharging may occur in the battery cell, the battery cell is exposed to heat, a sharp object such as a nail may penetrate through a casino of the battery cell or an external shock may be applied to the battery cell, the battery cell may be ignited. Flames or high-temperature gas ejected from a battery cell may cause chain ignition of neighboring battery cells accommodated inside the battery device.

When the flames generated in the battery device are exposed externally, there may be a problem in which other components around the battery device may broken or damaged, and other components may also suffer secondary ignition.

Chinese Patent Publication CN 112151699 A and U.S. Pat. No. 8,268,469 B2 disclose a configuration in which a flow space is formed in a side wall member of a battery pack to discharge gas generated in a battery cell externally.

However, the battery pack of the related art has a limit in forming a flow path having a sufficient length because the flow space is formed in the side wall member. Therefore, there is a problem that a flame may be exposed externally through a gas outlet (a venting hole), leading to secondary ignition.

SUMMARY

An aspect of the present disclosure is to provide a battery device, such as a battery pack or a battery module, in which external exposure of a flame may be delayed, prevented or significantly reduced.

An aspect of the present disclosure is to provide a battery device capable of improving structural rigidity.

According to an aspect of the present disclosure, a battery device includes a cell assembly having a plurality of battery cells; and a frame member having a bottom member, a cover member, and a side member connecting the bottom member and the cover member to form an accommodating space for accommodating at least one cell assembly therein. The frame member comprises a flow space therein so that the gas or flames generated in the cell assembly flow. The flow space comprises a first flow space formed in any one of the cover member and the bottom member and a second flow space formed in the side member, and the first flow space and the second flow space are connected to each other.

In embodiments, the flow space may be connected to an inlet and an outlet, and the flow space may have a shape partitioned by a partition wall to extend a length of a flow path between the inlet and the outlet.

In embodiments, the side member includes side wall members coupled to both ends of the cover member or both ends of the bottom member, and an end covering both ends of the accommodation space formed by the cover member, the bottom member, and the side wall members may be provided with plates, any one of the cover member and the bottom member is coupled to the side wall members to form a flow path forming member having the flow space through which the gas or flames generated in the cell assembly flow.

In this case, the flow path forming member may include the cover member and the side wall members respectively connected at both ends of the cover member, or may include the bottom member and the side wall members respectively connected at both ends of the bottom member.

In embodiments, the cover member or the bottom member connected to the side wall members is divided into a first member and a second member, and the flow path forming member includes the first member and a first sidewalls connected to the first member. It may be divided into a first flow path member including a, and a second flow path member including the second member and a second sidewall connected to the second member.

In embodiments, the flow space may include a first flow path formed in any one of the cover member and the bottom member, and a second flow path connected to the first flow path and formed in the side wall member. In this case, the first flow path and the second flow path may be connected to each other through an opening formed in a portion where the side wall member is connected to the cover member or the bottom member.

In embodiments, the flow path forming member has an inlet and an outlet connected to the flow space, the first flow path is connected to the inlet port, the second flow path is connected to the outlet port, and the outlet port is the frame. It may be communicated with a venting hole formed in the member.

In embodiments, the flow path forming member may be divided into a first flow path member and a second flow path member each having the first flow path and the second flow path.

In embodiments, the cover member includes a first cover and a second cover divided from each other, and the sidewall members include a first sidewall connected to the first cover and a second sidewall connected to the second cover, the flow path forming member may have a structure divided into a first flow path member including the first cover and the first sidewall, and a second flow path member including the second cover and the second sidewall.

In embodiments, the bottom member includes first bottom and a second bottom that are divided from each other, and the side wall members include a first sidewall connected to the first bottom and a second sidewall connected to the second bottom, wherein the flow path forming member has a structure divided into a first flow path member including the first bottom portion and the first sidewall, and a second flow path member including the second bottom portion and the second sidewall.

In embodiments, the first flow path member and the second flow path member may have a shape in which a predetermined cross-section is extended.

In embodiments, at least one of the first flow path and the second flow path has a shape open to the outside of the flow path forming member, and the end plate covers the open portion of the first flow path and the second flow path.

In embodiments, the end plate may include a flow path connection portion having a space for changing at least one of a flow direction on the first flow path and a flow direction on the second flow path.

In embodiments, at least one of the first flow path and the second flow path may include a zigzag shape or a tornado shape.

In embodiments, the first flow path ma have a zigzag shape or a tornado shape, and the second flow path may include a zigzag shape.

In embodiments, the frame member may include a venting hole connected to the flow space and discharging the gas generated in the cell assembly to the outside.

In this case, the venting hole may be formed in the end plate.

In embodiments, a flame blocking member for preventing the flame generated in the cell assembly from being exposed to the outside through the venting hole may be disposed on the venting hole or inside the flow space.

In embodiments, the battery cell may include a pouch-type secondary battery, a prismatic secondary battery, or a cylindrical secondary battery.

According to an aspect of the present disclosure, a battery device includes a cell assembly in which a plurality of battery cells are grouped; and a frame member having a bottom member, a cover member, and a side member connecting the bottom member and the cover member to form an accommodating space for accommodating at least one cell assembly therein. A portion of the frame members comprises a flow space in which the gas or flames generated in the cell assembly flow, and a flow path forming member having an inlet and an outlet connected to the flow space, the flow space includes a first flow path formed in any one of the cover member and the bottom member, and a second flow path connected to the first flow path and formed in the side member. The frame member may have a vent hole discharging the gas generated in the cell assembly externally, and the gas generated in the cell assembly may be discharged externally through the inlet, the first flow path, the second flow path, the outlet, and the venting hole.

The flow path forming member may be divided into a first flow path member and a second flow path member, and each of the first flow path member and the second flow path includes the inlet, the first flow path, the second flow path, and the outlet.

According to an aspect of the present disclosure, a battery device includes a cell assembly in which a plurality of battery cells are grouped; and a frame member having a bottom member, a cover member, and a side member connecting the bottom member and the cover member to form an accommodating space for accommodating the at least one cell assembly therein. The frame member has a flow space in which the gas or flames generated in the cell assembly flow, and a venting hole connected to the flow space and discharging gas externally and the flow space includes a first flow path formed in any one of the cover member and the bottom member and connected to the accommodation space through an inlet, and a second flow path formed in the side member and connected to the first flow path and the venting hole.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
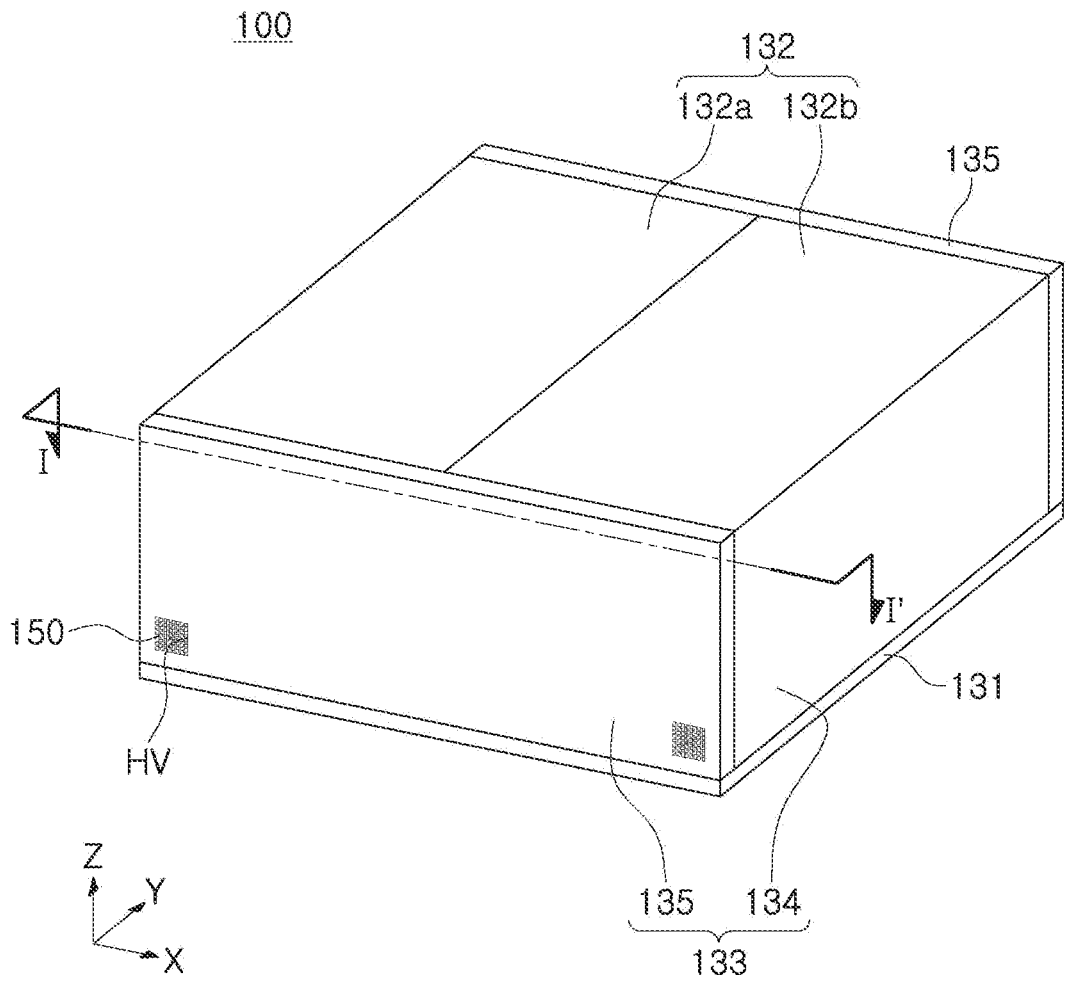
FIG. 1 is a perspective view of a battery device according to an embodiment of the present disclosure.

Prior to the detailed description of the present disclosure, the terms or words used in the present specification and claims described below should not be construed as being limited to conventional or dictionary meanings. Based on the principle that an inventor may appropriately define the concept of a term to best describe his invention, the terms or words used in the present specification and claims described below should be interpreted as meaning and concept consistent with the technical spirit of the present disclosure. Therefore, the configurations illustrated in the embodiments and drawings described in this specification are only the exemplary embodiments of the present disclosure, and do not represent all of the technical spirit of the present disclosure, and it should be understood that various equivalents and modifications may be substituted therefor at the time of filing the present application.

Hereinafter, embodiments will be described in detail with reference to the accompanying drawings. In this case, it should be noted that the same components in the accompanying drawings are denoted by the same reference numerals as much as possible. In addition, detailed descriptions of well-known functions and configurations that may obscure the gist of the present disclosure will be omitted. For the same reason, some components are exaggerated, omitted, or schematically illustrated in the accompanying drawings, and the size of each component does not fully reflect the actual size thereof.

The present disclosure relates to a battery device 100 having a plurality of battery cells 120 composed of secondary batteries. The battery device 100 according to the present disclosure may include both a battery pack and a battery module including a plurality of battery cells 120. For example, if the battery device 100 according to the present disclosure includes a plurality of battery cells 120, it is not limited to a battery pack having a cell-to-pack structure, and may include a battery module.

First, the battery device 100 according to an embodiment of the present disclosure will be described with reference to FIGS. 1 to 4.

Figure 2:
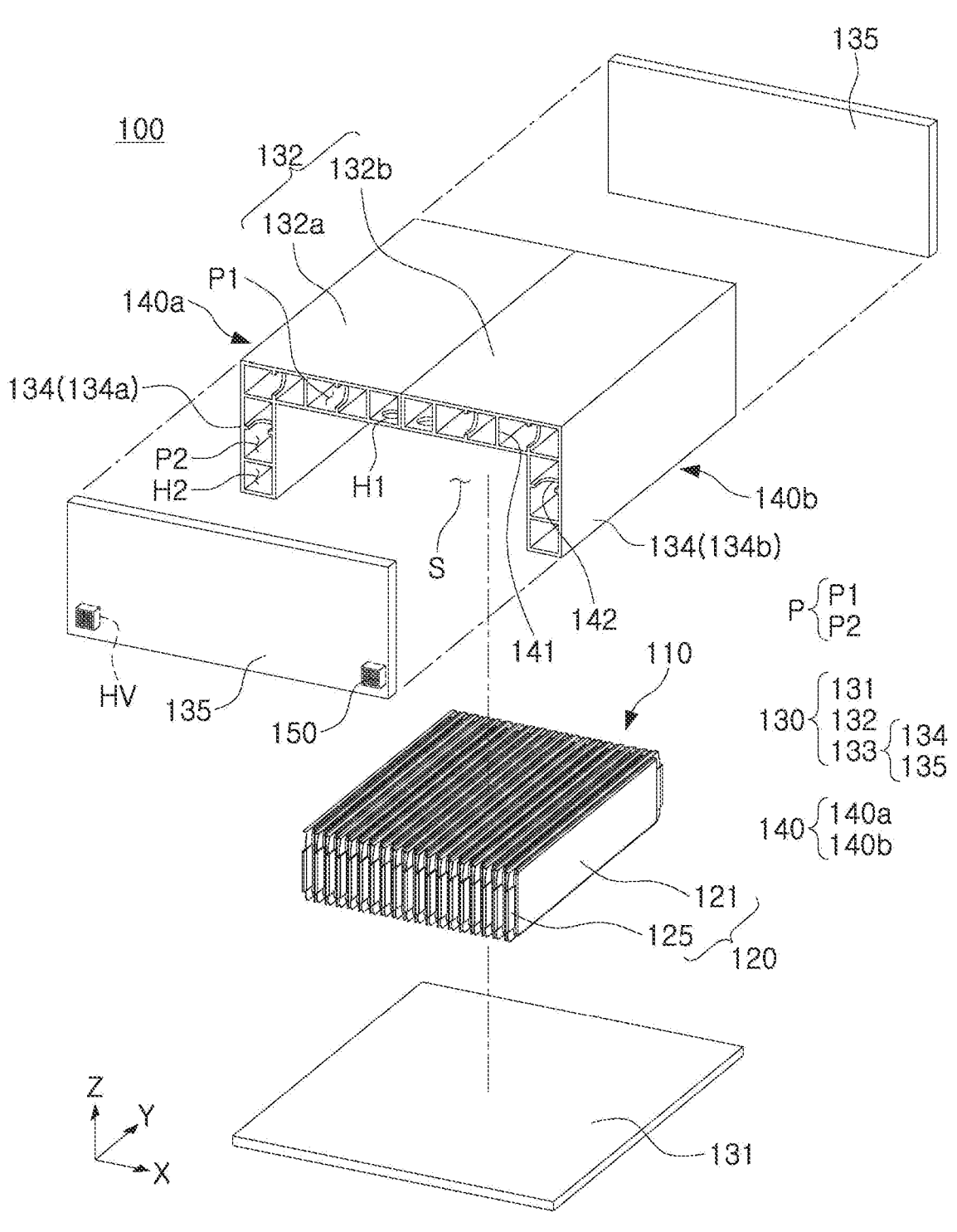
FIG. 2 is an exploded perspective view of the battery device illustrated in FIG. 1.
Figure 3:
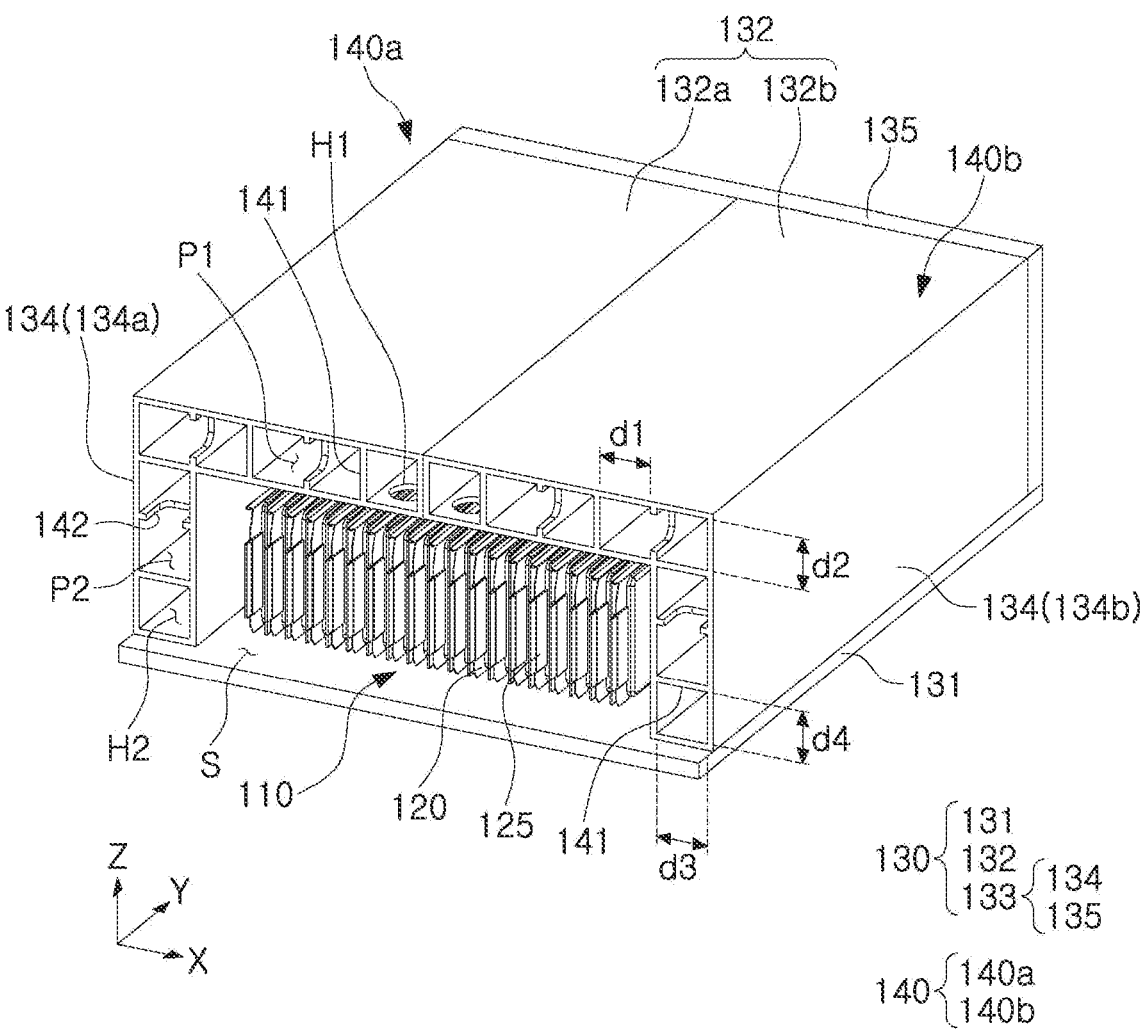
FIG. 3 is a perspective view illustrating a state in which the end plate is removed from the battery device illustrated in FIG. 1.
Figure 4:
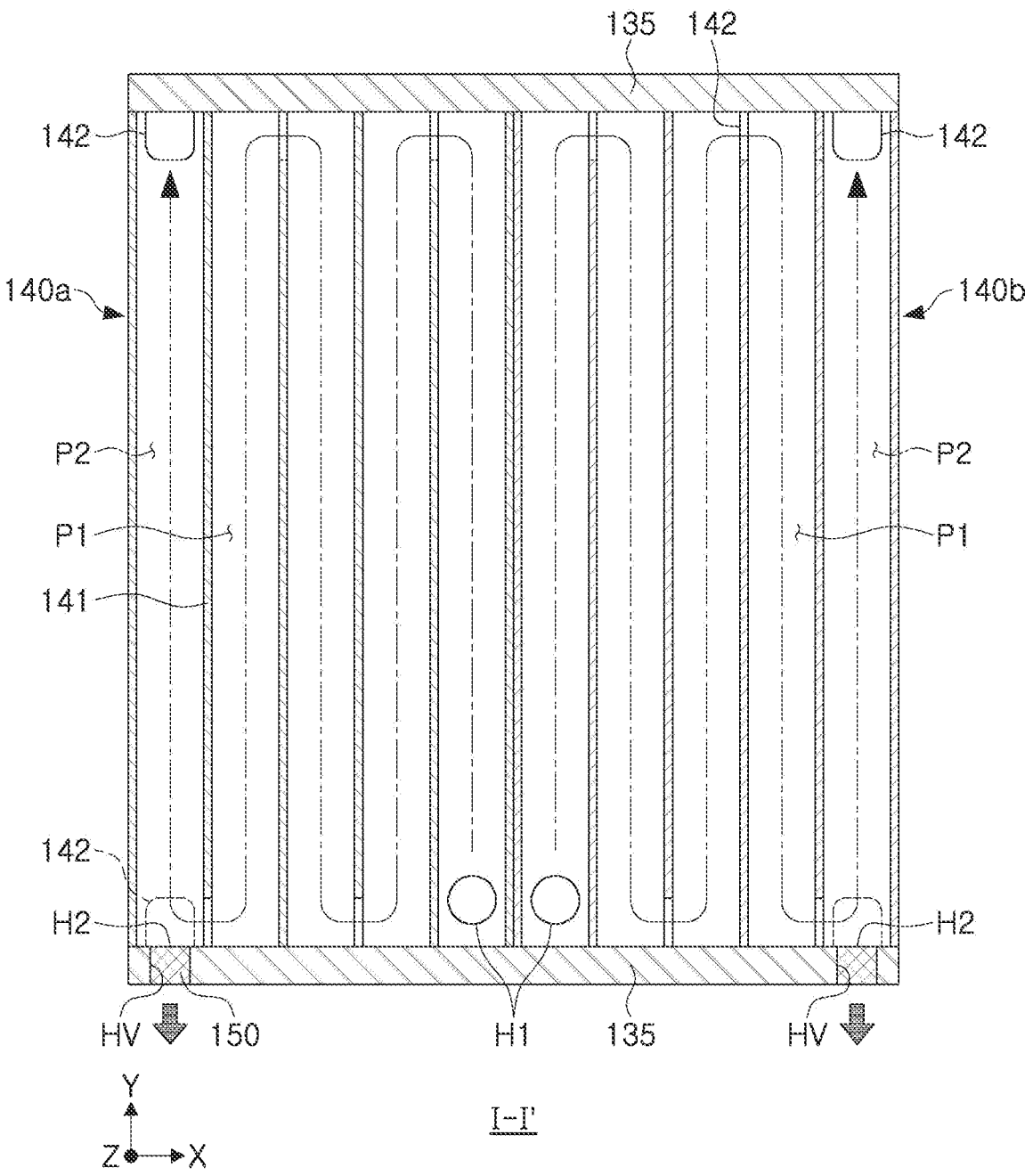
FIG. 4 is a cross-sectional view taken along line I-I' of FIG. 1.

FIG. 1 is a perspective view of a battery device 100 according to an embodiment of the present disclosure, FIG. 2 is an exploded perspective view of the battery device 100 illustrated in FIG. 1, FIG. 3 is a perspective view illustrating a state in which the end plate 135 has been removed from the battery device 100 illustrated in FIG. 1, and FIG. 4 is a cross-sectional view taken along line I-I' of FIG. 1.

The battery device 100 according to an embodiment may include a cell assembly 110 and a frame member 130.

The cell assembly 110 may have a structure in which a plurality of battery cells 120 are grouped. Each battery cell 120 may be configured as a secondary battery. For example, the battery cell 120 may include a lithium secondary battery, a nickel-cadmium battery, a nickel-metal hydride battery, a nickel-hydrogen battery, and the like.

The battery cell 120 may be configured as a pouch type secondary battery in which an electrode assembly (not illustrated) is accommodated in a casing (pouch) 121. However, in the embodiment of the present disclosure, the batter cell 120 is not limited to a pouch-type secondary battery. For example, the battery cell 120 may be configured as a can-type secondary battery accommodated in a casing having rigidity. For example, the battery cell 120 may be configured as a prismatic secondary battery having a prismatic cross-sectional shape or a cylindrical secondary battery having a circular cross-sectional shape. In addition the battery cell 120 may have a configuration in which a plurality of pouch-type secondary batteries are grouped to form a bundle. For convenience of description, a pouch-type secondary battery will be described as an example of the battery cell 120 according to an embodiment of the present disclosure.

The battery cell 120 may include a casing (pouch) 121 in which an electrode assembly (not illustrated) and an electrolyte are accommodated therein, and electrode terminals (electrode leads) 125 exposed externally of the casing 121.

The electrode assembly includes a plurality of electrode plates and electrode tabs and is accommodated in the casing 121. In this case, the electrode plate may be composed of a positive electrode plate and a negative electrode plate. The electrode assembly may be stacked in a state in which wide surfaces of the positive and negative plates face each other. The positive and negative plates may be stacked with a separator interposed therebetween.

An electrode tab (not illustrated) may be provided on each of the plurality of positive plates and the plurality of negative plates. Each of the electrode tabs may be connected to an electrode terminal (electrode lead) 125 so that the same polarities are in contact with each other. In the case of the battery cell 120 illustrated in FIG. 2, the two electrode terminals 125 are illustrated to face each other in opposite directions. However, the arrangement position or number of the electrode terminals 125 may be variously changed.

The cell assembly 110 may have a shape in which a plurality of battery cells 120 are stacked. For example, the battery cells 120 may be stacked in the first direction (X) in a state in which the wide side faces the first direction (X). However, the stacking direction of the battery cells 120 is not limited thereto, and it is also possible to stack the battery cells 120 in a lying state.

In addition, the arrangement shape of the battery cells 120 provided in the cell assembly 110 is not limited to a stacked shape. For example, when the battery cell 120 is configured as a cylindrical secondary battery, a plurality of battery cells 120 may be installed in a clustered form.

The battery cells 120 provided in the cell assembly 110 may be electrically connected to each other by a bus bar member (not illustrated) or a current collecting plate (not illustrated). Since the electrical connection structure of the battery cell 120 is known, a detailed description thereof will be omitted.

The frame member 130 forms an accommodation space S for accommodating the cell assembly 110. The frame member 130 covers the cell assembly 110 to protect the cell assembly 110 from the outside. For example, the frame member 130 may have a structure that covers six surfaces of the cell assembly 110.

The frame member 130 may include a bottom member 131, a cover member 132, and a side member 133 connecting between the bottom member 131 and the cover member 132 to cover the outer surface of the cell assembly 110.

The side member 133 may include side wall members 134 and end plates 135. The side wall members 134 may be integrally coupled to both ends of the cover member 132 or integrally coupled to both ends of the bottom member 131. The cover member 132, the bottom member 131, and the side wall member 134 may be coupled to each other to form a pipe-shaped accommodation space S with both ends open. The end plates 135 may cover the open both ends of the pipe-shaped accommodation space S.

The frame member 130 may have a flow space P so that the gas or flames generated in the cell assembly 110 flow in the receiving space S therein. The flow space P is connected to or communicated with the inlet H1 and the outlet H2 to form a space in which gas or flames flow.

A portion of the frame member 130 may form a flow space P in which the gas or flames generated in the cell assembly 110 flow, and a flow path forming member 140 having an inlet H1 and an outlet H2 connected to or communicated with the flow space P. In the flow path forming member 140, any one of the cover member 132 and the bottom member 131 may be coupled to the side wall members 134 to form a flow space P.

For example, the flow path forming member 140 may include a cover member 132 and side wall members 134 connected at both ends of the cover member 132, respectively Flow spaces P (P1, P2) may be formed in the cover member 132 and the side wall member 134 of the side member 133, respectively. The flow space P1 formed in the cover member 132 and the flow space P2 formed in the side wall member 134 may be connected to each other.

The flow space P may include a first flow path P1 formed in any one of the cover member 132 and the bottom member 131, and a second flow path P2 connected to or communicated with the first flow path P1 and formed in the side member 133. For example, the flow space P may include a first flow path P1 formed in the cover member 132 and a second flow path P2 formed in the side wall member 134. The first flow path P1 and the second flow path P2 may communicate with each other through an opening 142 formed in a portion where the cover member 132 and the side wall member 134 are connected.

The flow path forming member 140 may have an inlet H1 and an outlet H2 connected to or communicated with the flow space P. The inlet H1 may be formed on a surface of the cover member 132 opposite to the cell assembly 110. The outlet H2 may be connected to or communicated with the venting hole HV provided in the frame member 130.

The venting hole HV may discharge the gas generated in the accommodation space S externally. The venting hole HV may be formed in the endplate 135 and may be disposed at a position corresponding to the outlet H2. The venting hole HV may have an open structure. However, it is also possible that a valve (not illustrated) that is opened above a certain pressure is installed in the venting hole HV.

The first flow path P1 communicates with the inlet H1 so that the gas or flames generated in the accommodation space S may be introduced. One side of the second flow path P2 may be connected to or communicated with the first flow path P1, and the other side of the second flow path P2 may be connected to or communicated with the outlet H2.

The flow space P may have a shape partitioned by the partition wall 141 to extend the length of the flow path between the inlet H1 and the outlet H2. For example, the flow space P may include a zigzag-shaped flow path, or may include a flow path in the shape of a tornado (spiral in a plane), and may also include both a zigzag-shaped flow path and a tornado-shaped flow path.

At least one of the first flow path P1 formed in the cover member 132 and the second flow path P2 formed in the side wall member 134 may include a zigzag shape or a tornado shape (spiral shape in a plane). The first flow path P1 and the second flow path P2 may include both a zigzag shape and a tornado shape. In addition, it is also possible that only one of the first flow path P1 and the second flow path P2 has a zigzag-shaped flow path and/or a tornado-shaped flow path.

In the embodiment of FIGS. 2 to 4, the first flow path P1 may include a zigzag-shaped flow path, and the second flow path P2 may include a zigzag-shaped flow path. In FIGS. 2 to 4, to clearly show the structure of the flow path, the width d1 and the height d2 of the first flow path P1 and the width d3 and the height d4 of the second flow path P2 are illustrated in a slightly exaggerated form. The width d1 and height d2 of the first flow path P1, and the width d3 and height d4 of the second flow path P2 may have appropriate values according to design specifications in consideration of the cross-sectional area of the flow path. For example, to reduce the overall volume of the flow path forming member 140, the height d2 of the first flow path P1 is made smaller than the width d1 of the first flow path P1, and the second flow path P2. The width d3 of may be made smaller than the height d4 of the second flow path P2.

The zigzag-shaped flow path may be formed by the partition wall 141. The partition wall 141 may have a shape extending along the flow path direction. Accordingly, the flow path forming member 140 may have a shape in which a predetermined cross-section is extended.

In addition, at least one of the first flow path P1 and second flow path P2 may have a shape open externally of the flow path forming member 140. The end plate 135 may cover an open portion of the first flow path P1 and the second flow path P2.

For example, the respective partition walls 141 forming the first flow path P1 and the second flow path P2 extend to both ends of the flow path forming member 140, and may have a shape in which an end of the partition wall 141 may have a shape exposed externally. An end of the partition wall 141 may extend to the end plate 135.

As such, the flow path forming member 140 has a constant cross-sectional shape with both ends open in the longitudinal direction (Y) and may thus be easily manufactured by the extrusion process, and an open portion of the first flow path P1 and the second flow path P2 may be closed by the end plate 135.

To form a zigzag-shaped flow path, the partition wall 141 may have an opening 142 formed at a portion in which the flow direction is changed. A plurality of openings 142 may be formed in each of the first flow path P1 and the second flow path P2. The openings 142 may be formed alternately at both ends of the partition wall 141 in the longitudinal direction Y to form a zigzag flow path. Accordingly, the plurality of flow paths constituting the first flow path P1 may form a zigzag shape as a whole, and a plurality of flow paths constituting the second flow path P2 may also have a zigzag shape as a whole. Also, the first flow path P1 and the second flow path P2 may be connected through an opening 142 formed in a portion where the cover member 132 and the side wall member 134 are connected.

The opening 142 may be formed by machining a groove or a hole in the partition wall 141. For example, after the flow path forming member 140 of a certain cross-sectional shape is manufactured by an extrusion process, etc., since the opening 142 may be formed by machining a groove or a hole in the partition wall 141, a zigzag-shaped flow path may be easily formed.

Figure 5:
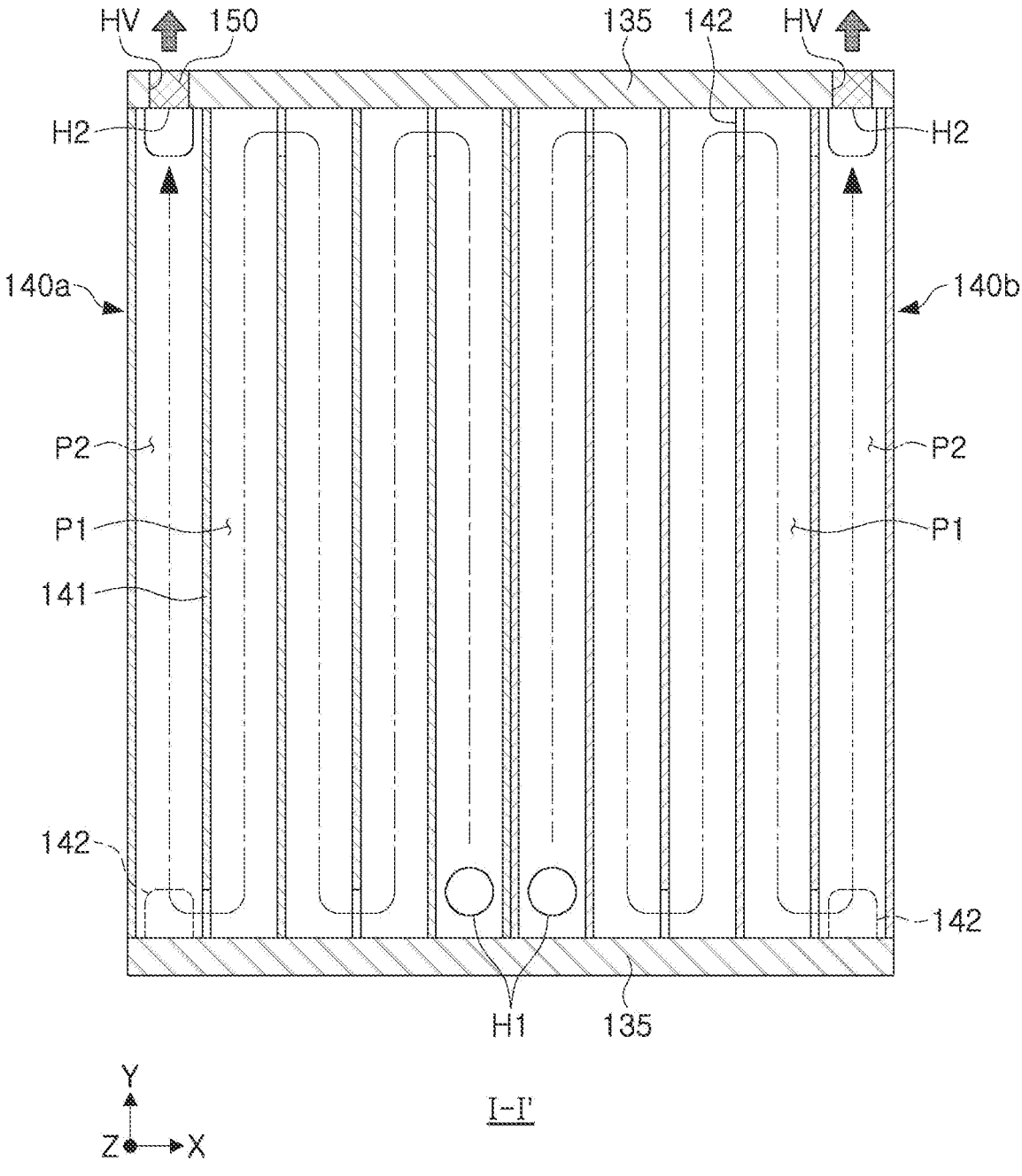
FIGS. 5 and 6 are cross-sectional views illustrating a modified example of FIG. 4.

The inlet H1 may be disposed on a surface opposite to the cell assembly 110 among the surfaces of the flow path forming member 140, and the outlet H2 may be disposed at a position in communication with the venting hole HV in the flow path forming member 140. The outlet H2 may be disposed on a surface opposite to the end ate 135 adjacent to the inlet H1 among the surfaces of the flow path forming member 140, but may also be disposed on opposite to the end plate 135 positioned on the opposite side of the inlet H1 as illustrated in FIG. 5.

FIGS. 2 to 4 illustrate an embodiment in which the inlet H1 is disposed on the lower surface of the cover member 132, and the outlet H2 is disposed at the end of the side wall member 134 at a position adjacent no the venting hole HV. In this case, the high-temperature gas generated in the cell assembly 110 accommodated in the accommodating space S ("gas" in this specification includes an electrolyte gas and a combustion material) or flame may flow through the inlet H1, the first flow path P1 formed in the cover member 132, and the second flow path P2 formed in the side wall member 134, and the gas may be discharged externally through the outlet H2 and the venting hole HV.

However, in the embodiment of the present disclosure, the positions of the inlet H1 and the outlet H2 are not limited thereto. For example, the inlet H1 may be disposed on the side of the side wall member 134, the outlet H2 may be disposed at the longitudinal direction (Y) end of the cover member 132, and the venting hole HV may also be disposed in correspondence with the position of the outlet H2. In this case, the gas or flames generated in the accommodation space S may flow through the inlet H1, the second flow path P2 formed in the side wall member 134, and the first flow path P1 formed in the cover member 132, and the gas may be discharged externally through the venting hole HV through the outlet H2. The first flow path P1 and the second flow path P2 are a concept for distinguishing the flow path formed in the cover member 132 and the flow path formed in the side wall member 134 from each other, and does not imply the order in which the gas or flames flow.

According to the embodiment of the present disclosure, a flow space P is formed in each of the cover member 132 and the side wall member 134, and the first flow path P1 formed on the cover member 132 and the second flow path P2 formed on the side wall member 134 communicate with each other, and therefore, the length of the flow path may be extended. For example, the gas or flames generated in the accommodate on space S may flow into the first flow path P1 of the first flow path member 140a through the inlet H1, and then flow into the second flow path P2 of the first flow path member 140a, or may flow into the first flow path P1 of the second flow path member 140b and then flow into the second flow path P2 of the second flow path member 140b. In detail, by forming at least one of the first flow path P1 and the second flow path P2 in a zigzag shape or a tornado shape, the length of the flow path may be further increased.

According to the embodiment of the present disclosure, the flow space P is formed with a long flow path over the cover member 132 and the side wall member 134, and the flame generated in the cell assembly 110 accommodated in the receiving space S may be extinguished or reduced in size while passing through the flow space P. Therefore, it is possible to delay, prevent, or minimize the phenomenon in which the flame generated in the accommodation space S discharged externally through the venting hole VH. In detail, when the flame blocking member is installed adjacent to the venting hole HV as will be described later, the possibility that the flame is discharged externally of the venting hole HV is further reduced.

Similarly, the high-temperature gas generated in the accommodation space S may be lowered in temperature while passing through the flow space P having a long-length flow path. Accordingly, the gas generated in the accommodation space S may be discharged externally through the outlet H2 and the venting hole HV in a state in which the temperature is lowered.

In addition, according to the embodiment of the present disclosure, since the flow space P is formed in the frame member 130 and the flow space P has a structure partitioned by the partition wall 141, it is possible to improve the rigidity of the frame member 130. In detail, according to the embodiment of the present disclosure, since the flow space P by the partition wall 141 is formed in both the cover member 132 and the side wall member 134, it is possible to significantly improve the rigidity of the frame member 130 compared to the prior art in which the flow space P is formed only on the side wall member.

On the other hand, the flow path forming member 140 may have a structure divided into a first flow path member 140a and a second flow path member 140b each having a first flow path P1 and a second flow path P2. Each of the first flow path member 140a and the second flow path member 140b may include at least one inlet H1 and at least one outlet H2.

The cover member 132 connected to the side wall member 134 may include a first cover (first member) 132a and a second cover (second member) 132b divided from each other. The sidewall members 134 may include a first side-wall 134a connected to the first cover 132a and a second sidewall 134b connected to the second cover 132b.

In this case, the first flow path member 140a may include a first cover (first member) 132a and a first sidewall 134a, and the second flow path member 140b may include a second cover (second member) 132b and a second sidewall 134b. A first flow path P1 is formed in each of the first cover 132a and the second cover 132b, and a second flow path P2 may be formed on the first sidewall 134a and the second sidewall 134b, respectively. The first flow path P1 and the second flow path P2 may be connected to each other through an opening 142 formed in a portion where the first cover 132a and the first sidewall 134a are connected, and an opening 142 formed in the portion where the second cover 132b and the second sidewall 134b.

In the embodiment of the present disclosure, the flow path forming member 140 is formed by being divided into the first flow path member 140a and the second flow path member 140b, and flame or gas may flow in the flow space P in a divided state without being concentrated in a specific flow space P. Therefore, the effect of blocking the external exposure of the flame and lowering the temperature of the hot gas may be increased.

In detail, when the flow path forming member 140 is formed by dividing the first flow path member 140a and the second flow path member 140b, there is an advantage that the flow path forming member 140 may be easily manufactured by the extrusion process. For example, when the flow path forming member 140 is divided into the first flow path member 140a and the second flow path member 140b, since it is possible to reduce the extrusion force required for the extrusion process compared to the case in which the flow path forming member 140 is integrally formed, the extrusion process may proceed easily.

The flame blocking member 150 is installed in the venting hole HV or is installed in the flow space P of the flow path forming member 140, thereby preventing the flame generated in the cell assembly 110 accommodated in the accommodating space S from being exposed externally through the venting hole HV or significantly reducing external exposure of the flame.

The flame blocking member 150 may be installed adjacent to the venting hole HV or the venting hole HV to block the flame from being exposed externally through the venting hole VH.

The flame blocking member 150 may include at least one of a porous metal foam and a metal mesh. The flame blocking member 150 may be formed of a flame retardant and heat resistant material. For example, the porous metal foam or metal mesh may include a metal material having a melting point of 1000° C. or higher. For example, the porous metal foam or metal mesh may include a Ni material having a melting point of 1400° C. or higher.

The porous metal foam may be formed by foaming a metal material such as Ni. In addition, the flame blocking member 150 may include one metal mesh or have a structure in which two or more metal meshes are stacked.

The porous metal foam or the metal mesh may have an average size of pores of 400~800 μm based on the diameter direction. When the average size of the pores is less than 400 μm, there is a problem in that the gas is not smoothly discharged due to a large resistance when the gas is discharged. In this case, the electrolyte gas or combustion materials generated inside the accommodation space S are not discharged. There is a problem in that secondary ignition is accelerated, such as thermal runaway. Conversely, when the average size of the pores exceeds 800 μm, the flame may penetrate through the pores and be exposed externally. In this case, the effect of blocking the flame is reduced, and the flame is exposed externally of the battery device 100. There is a problem in that other components adjacent to the battery device 100 are sequentially ignited.

On the other hand, in a case in which the flame blocking member 150 is relatively close to the ignition source, the flame may be exposed externally through the venting hole HV through the porous metal foam and the metal mesh. For example, in a case in which the distance between the ignition source and the flame blocking member 150 is relatively short, since the ejection pressure of the flame is large, the flame blocking member 150 cannot sufficiently perform the function of blocking the flame.

In the embodiment of the present disclosure, the flame clocking member 150 is located at a sufficiently distant distance from the ignition source, and therefore, it is possible to minimize the effect of the ejection pressure of the flame on the flame blocking member 150. To this end, the flame blocking member 150 may be installed at a position spaced apart from the inlet H1 side by a predetermined distance. For example, the flame blocking member 150 may be installed at a position more than 200 mm away from the inlet H1 based on the flow path from the inlet H1 to the venting hole VH.

In addition, the flame blocking member 150 may further include at least one of a fire extinguishing material and a phase change material (PCM) according to an endothermic reaction.

The extinguishing material may perform a function of extinguishing the flame flowing through the flow path. Digestive substances may consist of digestive capsules formed of substances with digestive functions in the form of capsules, but the present disclosure is not limited thereto. Since various substances are known for extinguishing substances, a detailed description thereof will be omitted.

In addition, the phase change material may reduce the temperature of the flame or gas by absorbing heat from the flame or high temperature gas flowing through the flow path. The phase change material may be composed or a phase change capsule prepared in the form of a capsule of an organic type, an inorganic type, or a mixture thereof, which has a phase change characteristic due to an endothermic reaction, but the present disclosure is not limited thereto. Since various materials are known for the phase change material, a detailed description thereof will be omitted.

On the other hand, in FIGS. 1 to 4, the flame blocking member 150 is illustrated to be provided adjacent to the venting hole HV, but a plurality of flame blocking members 150 may be provided in the flow space P. To this end, digestive substances or phase change substances may be disposed separately from the porous metal foam and/or the metal mesh in the flow path located at the front end of the porous metal foam and/or metal mesh among the entire flow path.

Next, a modified example of the flow space P formed in the batter device 100 will be described with reference to FIGS. 5 and 6. 5 and 6 are cross-sectional views illustrating a modified example of FIG. 4.

Compared with FIGS. 4 and 5, in FIG. 4, the venting hole HV is disposed on the end plate 135 positioned adjacent to the inlet H1, but in FIG. 5, there is a difference in that the venting hole HV is disposed on the end plate 135 located on the opposite side of the inlet H1.

For example, there is a difference between FIGS. 4 and 5 in the position of the end plate 135 in which the venting hole HV is disposed. Since the first flow path P1 and the second flow path P2 of FIGS. 4 and 5, have a zigzag shape, by adjusting the total number of spaces partitioned by the partition wall the arrangement positions of the inlet H1, the outlet H2, and the venting hole HV may be adjusted. For example, when the total number of spaces partitioned by the partition wall 141 in the first flow path P1 and the second flow path P2 is an even number, as illustrated in FIG. 4, a venting hole HV may be formed in the end plate adjacent to the inlet H1 and an outlet H2 may be formed adjacent to the venting hole HV. Conversely, when the total number of spaces partitioned by the partition wall 141 in the first flow path P1 and the second flow path P2 is an odd number, as illustrated in FIG. 5, a venting hole HV may be formed in the end plate positioned on the opposite side of the inlet H1 and an outlet H2 may be formed adjacent to the venting hole HV.

Figure 6:
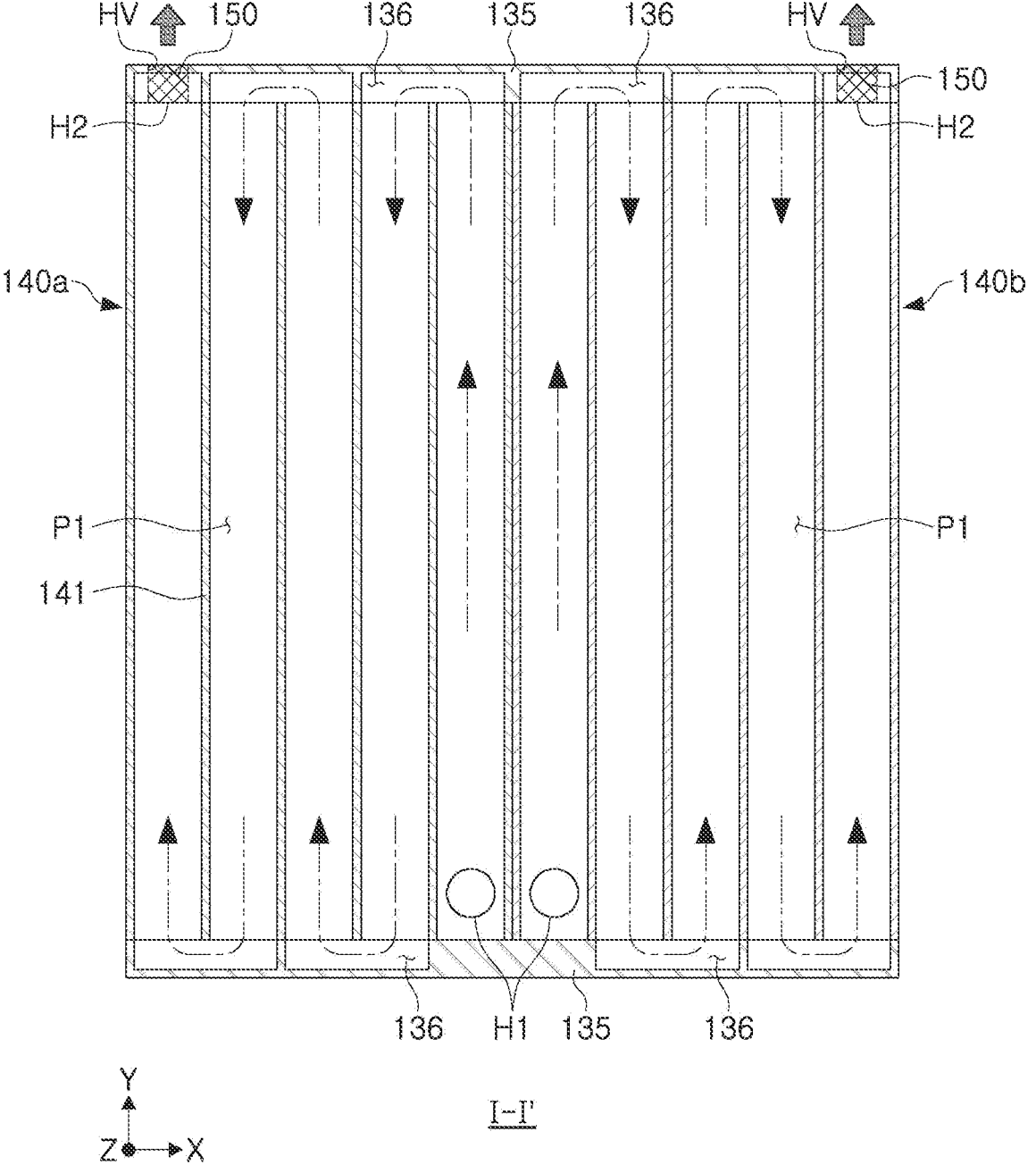

Similar to FIG. 4, the modified example of FIG. 6 may have a shape in which the respective partition walls 141 forming the first flow path P1 and the second flow path P2 extend to both ends of the flow path forming member 140, and the end of the partition wall 141 is exposed externally. An end of the partition wall 141 may extend to the end plate 135. However, in FIG. 4, an opening 142 for changing the flow direction is formed in a portion of the partition wall 141 where the partition wall 141 is connected to the end plate 135, and in the modified example of FIG. 6, there is a difference in that the opening 142 for changing the flow direction is not formed in the portion of the partition wall 141 where the partition wall 141 is connected to the end plate 135.

In the modified example of FIG. 6, the end plate 135 may include a flow path connection portion 136 in which a space for changing or switching at least one of a flow direction on the first flow path P1 and a flow direction on the second flow path P2 is formed. For example, in the flow space (P; P1, P2) having a zigzag shape, the flow direction may be changed in the flow path connection portion 136 formed in the end plate 135. In this case, unlike the embodiment of FIG. 4, there is no need to install the opening 142 for changing the flow direction in the partition wall 141 where the partition wall 141 is connected to the end plate 135. There is an advantage that the production of the flow forming member becomes easy.

Next, a battery device 100a according to another embodiment of the present disclosure will be described with reference to FIGS. 7 and 8.

Figure 7:
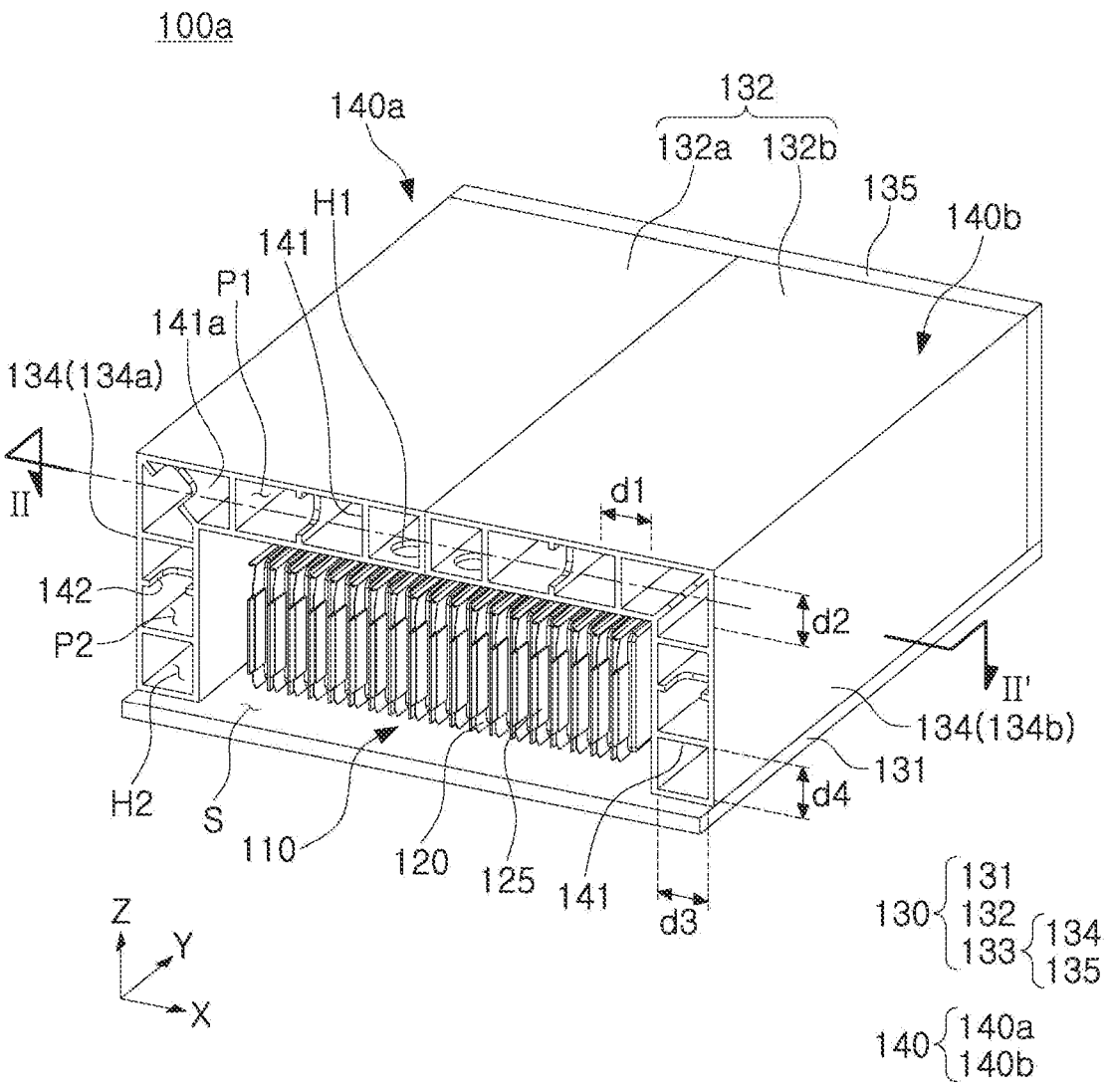
FIG. 7 is a perspective view of a battery device according to another embodiment of the present disclosure, illustrating a state in which the end plate is removed.
Figure 8:
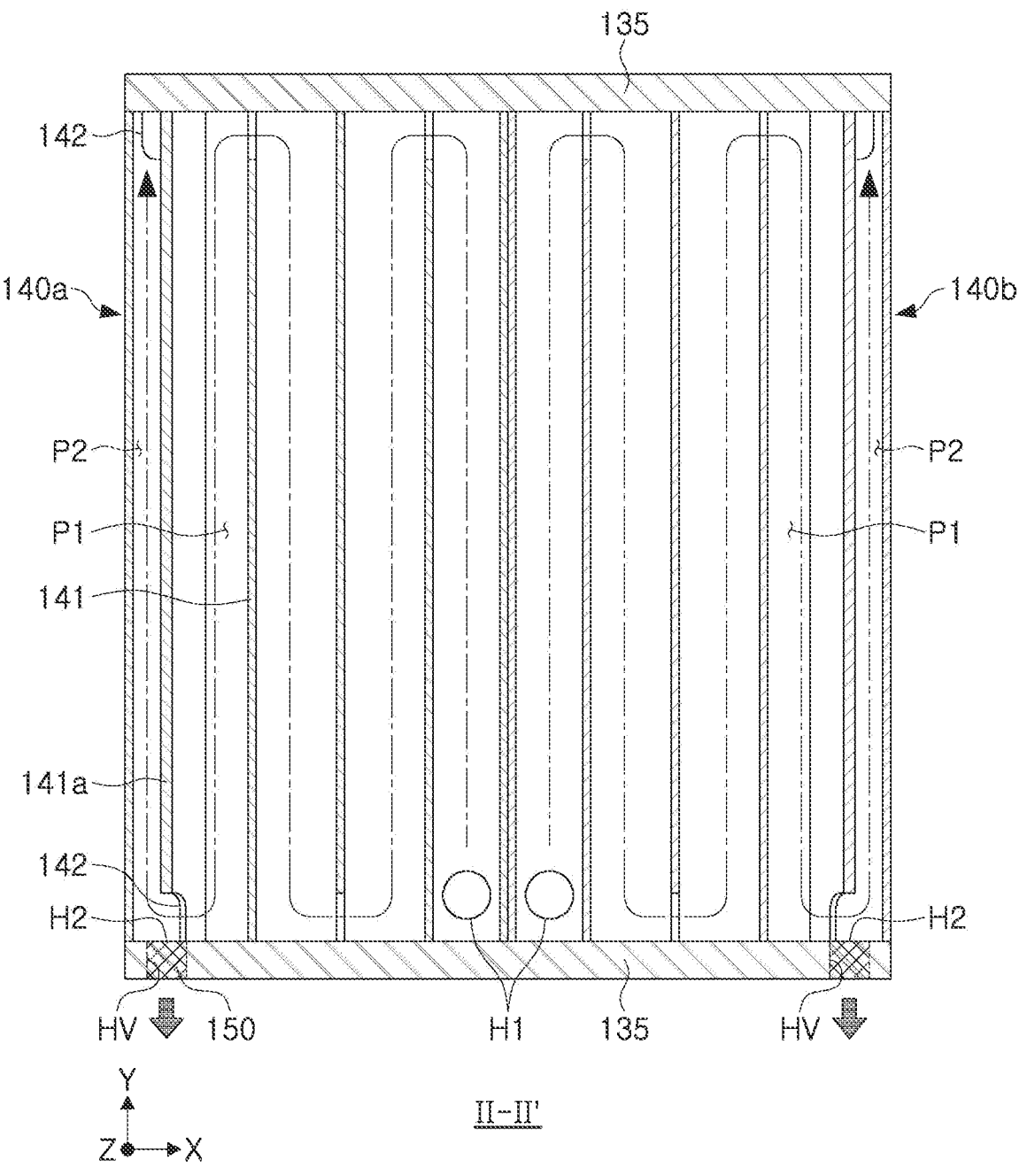
FIG. 8 is a cross-sectional view taken alone line II-II' of FIG. 7.

FIG. 7 is a perspective view of the battery device 100a according to another embodiment of the present disclosure, illustrating a state in which the end plate 135 is removed, and FIG. 8 is a cross-sectional view taken along line of FIG. 7.

The embodiment of FIGS. 7 and 8 may include the cell assembly 110 and the frame member 130 like the battery device 100 described with reference to FIGS. 1 to 4. The battery device 100a illustrated in FIGS. 7 and 8 has a difference from the battery device 100 illustrated in FIGS. 1 to 4 only in that the partition wall 141a of the portion where the cover member 132 and the side wall member 134 is connected has an inclined shape. Therefore, to avoid unnecessary duplication, detailed descriptions of the same or similar components will be omitted and will be mainly described with different components.

In the embodiment of FIGS. 7 and 8, the partition wall 141a of the portion where the cover member 132 and the side wall member 134 are connected has an inclined shape. Accordingly, the opening 142 of the portion where the cover member 132 and the side wall member 134 are connected may be formed in the inclined partition wall 141a. In this case, the flow between the first flow path P1 of the cover member 132 and the second flow path P2 of the side wall member 134 may be smoothly performed. For example, in the opening 142 connecting the first flow path P1 and the second flow path P2, the flow direction is switched from the horizontal direction to the vertical direction so that the flow resistance may be large, but when the opening 142 is formed in the inclined partition wall 141$a$, the flow resistance may be reduced.

In addition, in the embodiment of FIGS. 7 and 8, the partition wall 141$a$ inclined at the edge of the portion where the cover member 132 and the side wall member 134 are connected in the frame member 130 is supported by the frame member 130. The rigidity of the edge part of the frame member 130 may be increased.

Next, a battery device 100$b$ according to another embodiment of the present disclosure will be described with reference to FIGS. 9 and 10.

Figure 9:
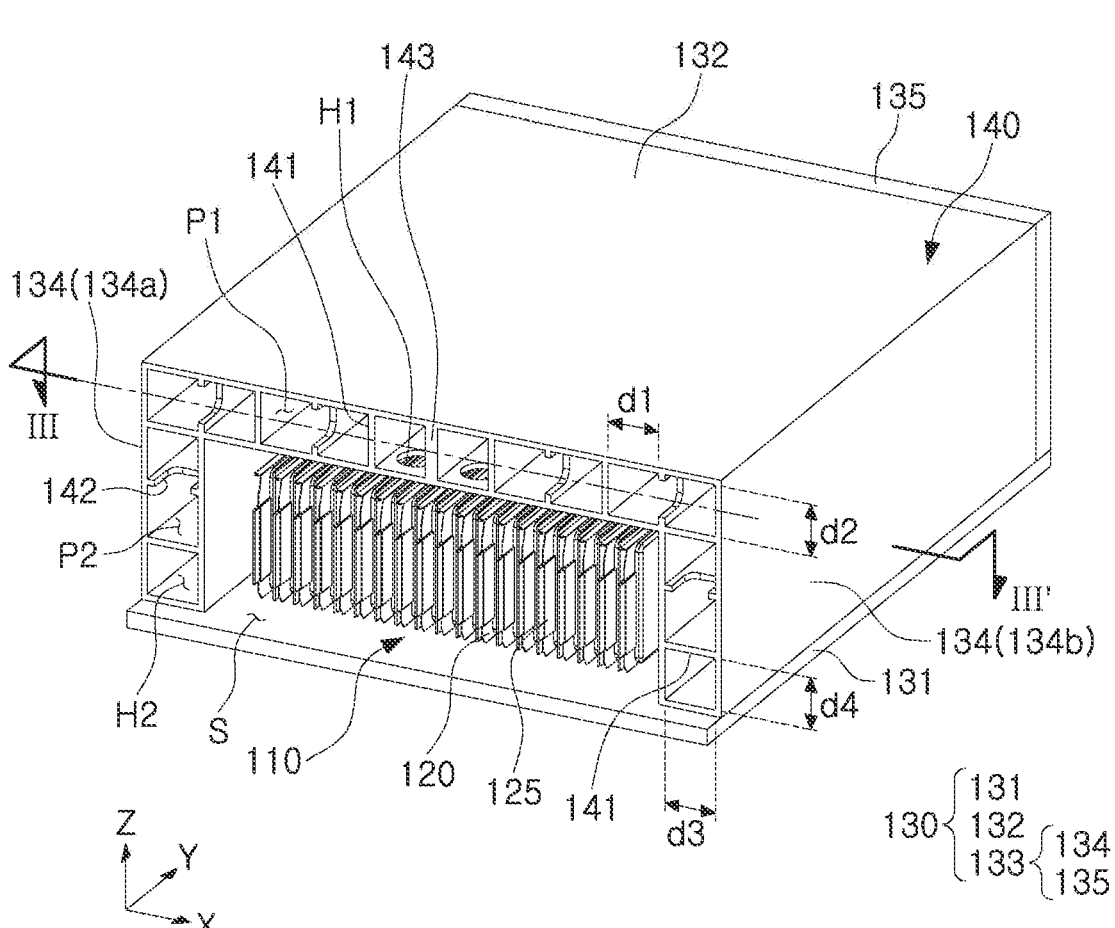
FIG. 9 is a perspective view of a battery device according to another embodiment of the present disclosure, illustrating a state in which the end plate is removed.
Figure 10:
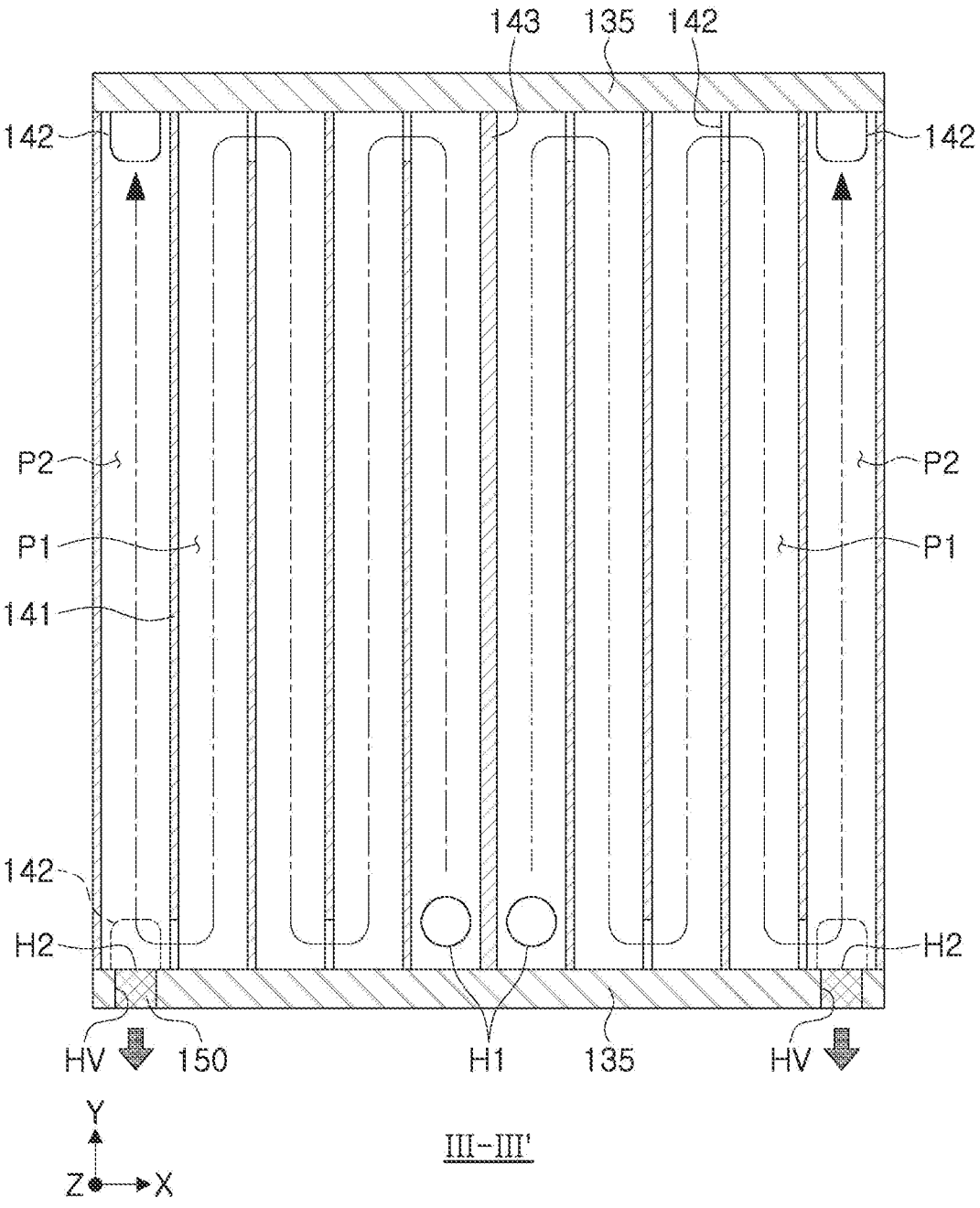
FIG. 10 is a cross-sectional view taken along line III-III' of FIG. 9.

FIG. 9 is a perspective view of the battery device 100$b$ according to another embodiment of the present disclosure, illustrating a state in which the end plate 135 is removed, and FIG. 10 is a cross-sectional view taken along line III-III' of FIG. 9.

The embodiment of FIGS. 9 and 10 may include the cell assembly 110 and the frame member 130 like the battery device 100 described with reference to FIGS. 1 to 4. The battery device 100$b$ illustrated in FIGS. 9 and 10 has a difference from the battery device 100 illustrated in FIGS. 1 to 4 in that the cover member 132 is not separated into a first cover (132$a$ in FIG. 2) and a second cover (132$b$ in FIG. 2), and has an integrated structure. Therefore, to avoid unnecessary duplication, detailed descriptions of the same or similar components will be omitted and will be mainly described with different components.

In the embodiment of FIGS. 9 and 10, the cover member 132 has an integrated structure. The flow path forming member 140 has a shape in which a first sidewall 134$a$ and a second sidewall 134$b$ are integral y connected to both ends of the cover member 132.

The cover member 132 may include a plurality of first flow paths P1 and a plurality of inlets H1 partitioned from each other. For example, the first flow path P1 formed on one side of the cover member 132 and the first flow path P1 formed on the other side of the cover member 132 may be partitioned by the partition wall 143. In addition, the first flow path P1 of one side of the cover member 132 is connected to the second flow path P2 of the first side wall 134$a$, and the first flow path P1 of the other side of the cover member 132 may be connected to the second flow path P2 of the second sidewall 134$b$.

For example, even when the cover member 132 has an integrated structure, the flow path forming member 140 may have a structure in which the plurality of first flow paths P1 and the plurality of second flow paths P2 are partitioned from each other. As described above, since the plurality of flow paths have a structure in which they are partitioned from each other, the flame or gas may flow through the flow space P in a divided state without being concentrated in a specific flow space P. Therefore, even when the flow path forming member 140 has an integrated structure, it is possible to increase the effect of blocking external exposure of the flame and lowering the temperature of the hot gas.

Next, a battery device 100$c$ according to another embodiment of the present disclosure will be described with reference to FIGS. 11 and 12.

Figure 11:
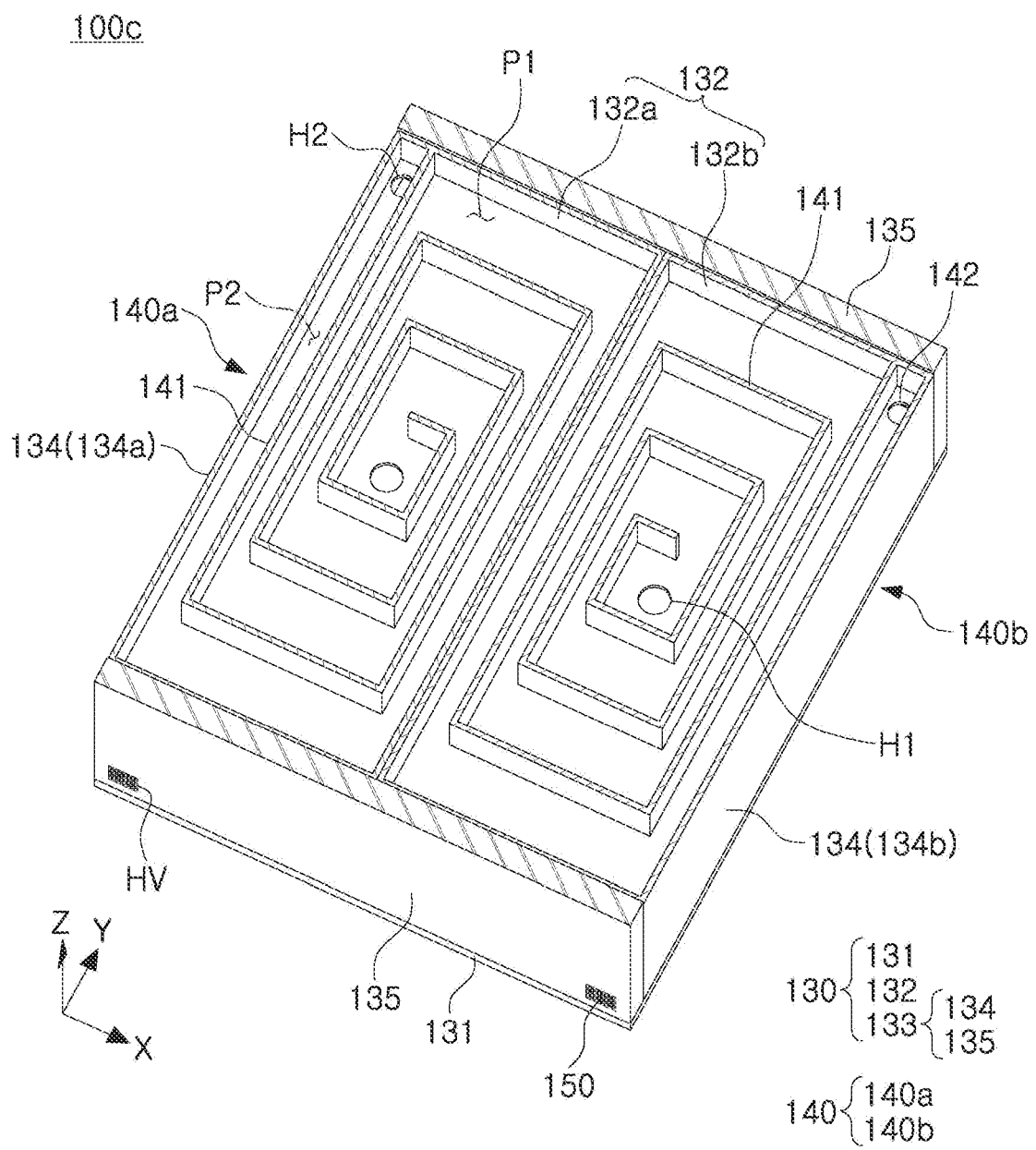
FIG. 11 is a perspective view of a battery device according to another embodiment of the present disclosure, illustrating a state in which the cover member and the end plate are partially cut.
Figure 12:
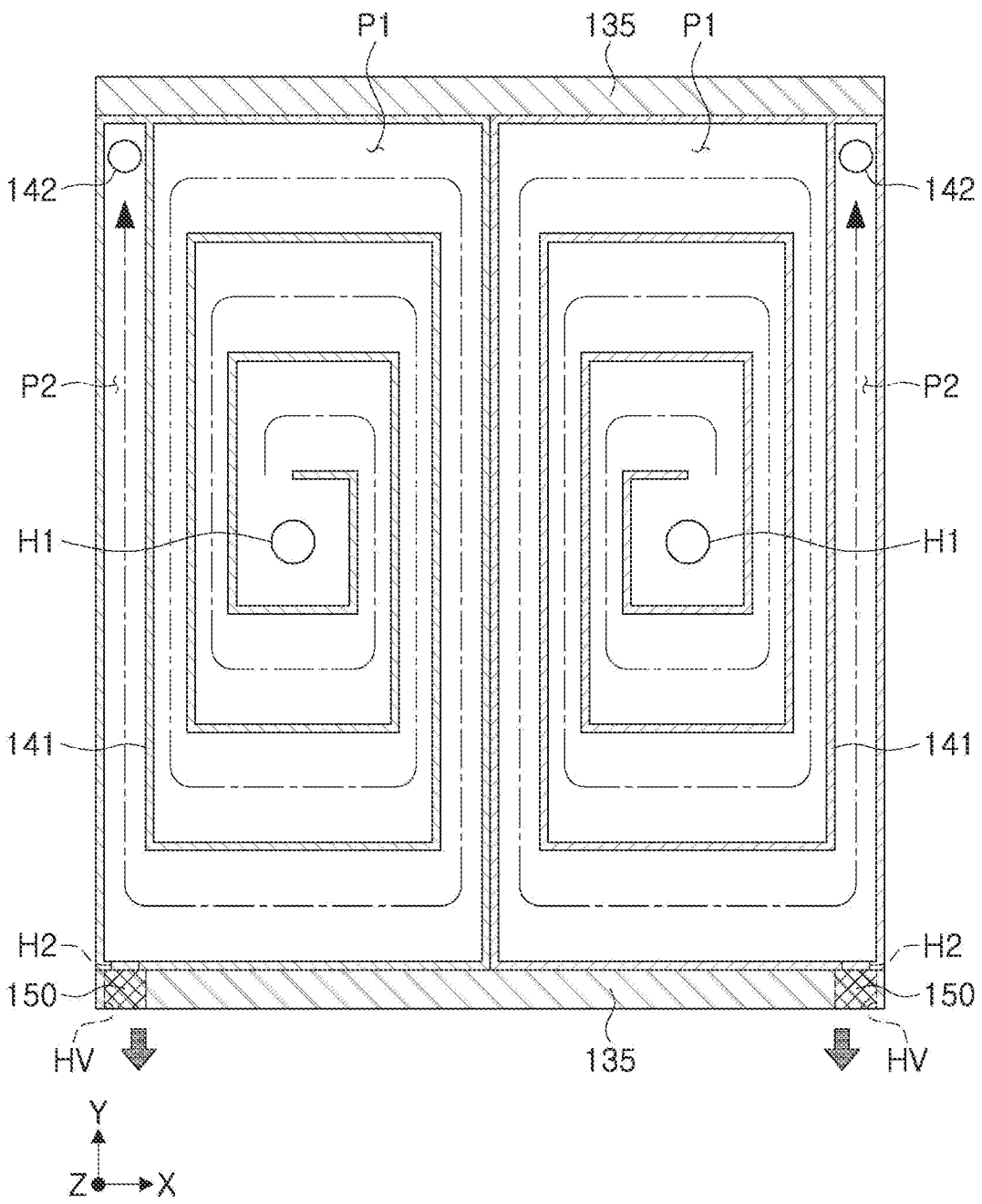
FIG. 12 is a plan view of FIG. 11.

FIG. 11 is a perspective view of the battery device 100$c$ according to another embodiment of the present disclosure, illustrating a state in which the cover member 132 and the end plate 135 are partially cut, and FIG. 12 is a plan view of FIG. 11.

The embodiment of FIGS. 11 and 12 may include the cell assembly 110 and the frame member 130 like the battery device 100 described with reference to FIGS. 1 to 4. When the battery device 100$c$ illustrated in FIGS. 11 and 12 is compared with the battery device 100 illustrated in FIGS. 1 to 4, there is a difference in that the first flow path P1 formed in the cover member 132 has a tornado shape. Therefore, to avoid unnecessary duplication, detailed descriptions of the same or similar components will be omitted and will be mainly described with different components.

In the embodiment of FIGS. 11 and 12, the first flow path P1 may include a tornado shape. The first flow path P1 may be formed in the cover member 132, and the inlet H1 may be formed in the center of the first flow path P1. Although the shape of the second flow path P2 is not illustrated in FIGS. 11 and 12, the second flow path P2 may have a zigzag shape like the embodiments of FIGS. 2 to 4. As such, the first flow path P1 and the second flow path P2 may have different shapes among a tornado shape and a zigzag shape.

On the other hand, any one of the first flow path P1 and the second flow path P2 may be formed as a single space that is not partitioned by the partition wall 141. For example, the first flow path P1 may have a tornado shape and the second flow path P2 may be configured as one undivided space. For example, in the embodiment of the present disclosure, if the first flow path P1 formed on the cover member 132 and the second flow path P2 formed on the side wall member 134 communicate with each other, the detailed shapes of the first flow path P1 and the second flow path P2 may be variously changed.

Figure 13:
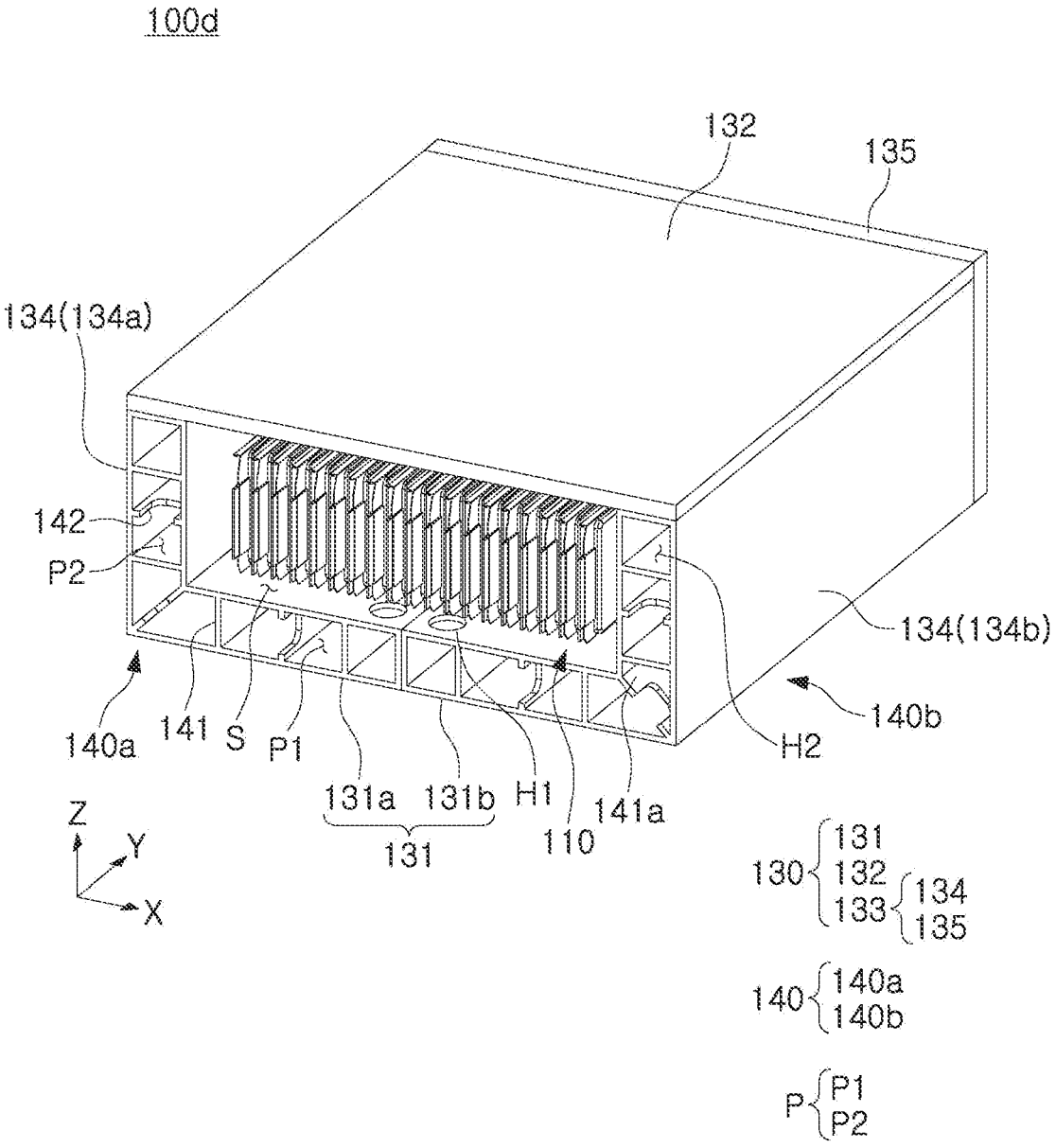
FIG. 13 is a perspective view of a battery device according to another embodiment of the present disclosure, illustrating a state in which the end plate is removed.

Finally, a battery device 100$d$ according to another embodiment of the present disclosure will be described with reference to FIG. 13. FIG. 13 is a perspective view of a battery device according to another embodiment of the present disclosure, illustrating a state in which the end plate is removed.

The battery device 100$d$ illustrated in FIG. 13 may include a cell assembly 110 and a frame member 130 similarly to the battery device 100 described with reference to FIGS. 1 to 4. The battery device 100$d$ illustrated in FIG. 13 has a configuration similar to that of the battery device 100 described with reference to FIGS. 1 to 4, Except that the flow path forming member 140 is composed of the bottom member 131 and the side wall members 134 connected at both ends of the bottom member 131, respectively. Therefore, to avoid unnecessary duplication, detailed descriptions of the same or similar components will be omitted and will be mainly described with different components.

The frame member 130 may include a bottom member 131, a cover member 132, and a side member 133. The side member 133 may include side wall members 134 and end plates 135.

The flow path forming member 140 may include a bottom member 131 and side wall members 134 connected at both ends of the bottom member 131, restively. Flow spaces P (P1, P2) may be formed in the bottom member 131 and the side wall member 134 of the side member 133, respectively. The flow space P1 formed in the bottom member 131 and the flow space P2 formed in the side wall member 134 may be connected to each other.

The flow space P may include a first flow path P1 formed in the bottom member 131 and a second flow path P2 formed in the side wall member 134. An inclined partition wall 141$a$ may be provided at a portion where the bottom member 131 and the side wall member 134 are connected. The first flow path P1 and the second flow path P2 may communicate with each other through the opening 142 formed in the inclined partition wall 141*a*. The first flow path P1 communicates with the inlet H1 so that the gas or flames generated in the accommodation space S may be introduced. The inlet H1 may be formed on a surface or the bottom member 131 that faces the cell assembly 110.

The flow path forming member 140 may have a structure divided into a first flow path member 140*a* and a second flow path member 140*b* each having a first flow path P1 and a second flow path P2.

The bottom member 131 connected to the side wall member 134 may include a first bottom (first member) 131*a* and a second bottom (second member) 131*b* that are divided from each other. The sidewall members 134 may include a first sidewall 134*a* connected to the first bottom part 131*a* and a second sidewall 134*b* connected to the second bottom part 131*b*.

In this case, the first flow path member 140*a* may include a first bottom (first member) 131*a* and a first sidewall 134*a*, and the second flow path member 140*b* may include a second bottom (second member) 131*b* and a second sidewall 134*b*. A first flow path P1 is formed in each of the first bottom part 131*a* and the second bottom part 131*b*, and a second flow path P2 may be formed in each of the first sidewall 134*a* and the second sidewall 134*b*.

Accordingly, the gas or flames generated in the accommodation space S flows into the first flow path P1 of the first flow path member 140*a* through the inlet H1, and then flows into the second flow path P2 of the first flow path member 140*a*, or flows into the first flow path P1 of the second flow path member 140*b*, and may then flow into the second flow path P2 of the second flow path member 140*b*.

In the embodiment of FIG. 13, a flow path of a long length is formed in the flow space P through the bottom member 131 and the side wall member 134, and the flame generated in the accommodation space S may be extinguished or reduced in size while passing through the flow space P. Therefore, it is possible to delay, prevent, or minimize the phenomenon in which the flame generated in the accommodation space S is discharged externally through the venting hole VH. In detail, since the flame blocking member is installed adjacent to the venting hole HV, the possibility that the flame s discharged externally is further lowered.

Similarly, the high-temperature gas generated in the accommodation space S may be lowered in temperature while passing through the flow space P having a long-length flow path. Accordingly, the gas generated in the accommodating space S may be discharged externally through the outlet H2 and the venting hole HV connected to the second flow path P2 while the temperature is lowered.

In addition, since the flow path forming member 140 is divided into the first flow path member 140*a* and the second flow path member 140*b*, flames or gas may flow in the flow space P in a divided state without being concentrated in a specific flow space P. Therefore, the effect of blocking the external exposure of the flames and lowering the temperature of the hot gas may be increased.

As set forth above, according to an embodiment having such a configuration, an effect of delaying, preventing, or significantly reducing exposure of flames generated in the cell assembly accommodated in the frame member externally of the battery device may be obtained.

In addition, according to an embodiment, an effect that the structural rigidity of the battery device may be improved through a flow path forming member in which a barrier rib is formed.

While example embodiments have been illustrated and described above, it will be apparent to those skilled in the art that modifications and variations could be made without departing from the scope of the present disclosure as defined by the appended claims.

For example, it may be implemented by deleting some components in the above-described embodiment, and each embodiment may be implemented in combination with each other.

What is claimed is:

1. A battery device comprising:
a cell assembly having a plurality of battery cells; and
a frame member having a bottom member, a cover member, and a side member connecting the bottom member and the cover member to form an accommodating space for accommodating at least one cell assembly therein,
wherein the frame member comprises a flow space therein so that the gas or flames generated in the cell assembly flow,
the flow space comprises a first flow space formed in any one of the cover member and the bottom member and a second flow space formed in the side member,
the first flow space and the second flow space are connected to each other,
the side member includes side wall members coupled to both ends of the cover member or both ends of the bottom member, and end plates covering both ends of the accommodating space formed by the cover member, the bottom member, and the side wall members,
any one of the cover member and the bottom member is coupled to the side wall members to form a flow path forming member having the flow space through which the gas or flames generated in the cell assembly flow,
each of the side wall members is integrally formed with at least a part of the cover member or at least a part of the bottom member to form the flow path forming member, and
the flow path forming member has a constant cross-sectional shape with both ends open in a longitudinal direction of the flow path forming member.

2. The battery device of claim 1, wherein the flow space is connected to an inlet and an outlet, and
the flow space has a shape partitioned by a partition wall to extend a length of a flow path between the inlet and the outlet.

3. The battery device of claim 1, wherein the flow path forming member includes the cover member and the side wall members respectively connected at both ends of the cover member, or includes the bottom member and the side wall members respectively connected at both ends of the bottom member.

4. The battery device of claim 3, wherein the cover member or the bottom member connected to the side wall members is divided into a first member and a second member, and
the flow path forming member is divided into a first flow path member including the first member and a first sidewall connected to the first member, and a second flow path member including the second member and a second sidewall connected to the second member.

5. The battery device of claim 1, wherein the flow space includes a first flow path formed in any one of the cover member and the bottom member, and a second flow path connected to the first flow path and formed in the side wall members.

6. The battery device of claim 5, wherein the first flow path and the second flow path are connected through an opening formed in a portion where the side wall members is connected to the cover member or the bottom member.

7. The battery device of claim 5, wherein the flow path forming member has an inlet and an outlet connected to the flow space,
the first flow path is connected to the inlet,
the second flow path is connected to the outlet, and
the outlet is communicated with a venting hole formed in the frame member.

8. The battery device of claim 5, wherein the flow path forming member is divided into a first flow path member and a second flow path member each having the first flow path and the second flow path.

9. The battery device of claim 5, wherein the cover member includes a first cover and a second cover divided from each other,
the side wall members include a first side wall connected to the first cover and a second side wall connected to the second cover, and
the flow path forming member has a structure divided into a first flow path member including the first cover and the first sidewall, and a second flow path member including the second cover and the second sidewall.

10. The battery device of claim 5, wherein the bottom member includes a first bottom portion and a second bottom portion divided from each other,
the side wall members include a first side wall connected to the first bottom portion and a second side wall connected to the second bottom portion, and
the flow path forming member has a structure divided into a first flow path member including the first bottom portion and the first sidewall, and a second flow path member including the second bottom portion and the second sidewall.

11. The battery device of claim 5, wherein at least one of the first flow path and the second flow path has a shape open externally of the flow path forming member, and
the end plates cover an open portion of the first flow path and the second flow path.

12. The battery device of claim 5, wherein at least one of the first flow path and the second flow path has a shape open externally of the flow path forming member, and
the end plates include a flow path connecting portion having a space for changing at least one of a flow direction on the first flow path and a flow direction on the second flow path.

13. The battery device of claim 5, wherein at least one of the first flow path and the second flow path includes at least one of a zigzag shape and a tornado shape.

14. The battery device of claim 1, wherein the frame member includes a venting hole connected to the flow space and discharging the gas generated in the cell assembly externally.

15. The battery device of claim 14, wherein the side member includes side wall members coupled to both ends of the cover member or both ends of the bottom member, and end plates covering both ends of the accommodating space formed by the cover member, the bottom member, and the side wall members, and
the venting hole is formed in the end plates.

16. The battery device of claim 14, wherein a flame blocking member for preventing the flame generated in the cell assembly from being exposed externally through the venting hole is disposed on the venting hole or inside the flow space.

17. A battery device comprising:
a cell assembly in which a plurality of battery cells are grouped; and
a frame member having a bottom member, a cover member, and a side member connecting the bottom member and the cover member to form an accommodating space for accommodating at least one cell assembly therein,
wherein a portion of the frame members comprises a flow space in which the gas or flames generated in the cell assembly flow, and a flow path forming member having an inlet and an outlet connected to the flow space,
the flow space includes a first flow path formed in any one of the cover member and the bottom member, and a second flow path connected to the first flow path and formed in the side member,
the frame member has a vent hole discharging the gas generated in the cell assembly externally,
the gas generated in the cell assembly is discharged externally through the inlet, the first flow path, the second flow path, the outlet and the venting hole,
the side member includes side wall members coupled to both ends of the cover member or both ends of the bottom member, and end plates covering both ends of the accommodating space formed by the cover member, the bottom member, and the side wall members,
the flow path forming member has a structure that any one of the cover member and the bottom member is coupled to the side wall members,
each of the side wall members is integrally formed with at least a part of the cover member or at least a part of the bottom member to form the flow path forming member, and
the flow path forming member has a constant cross-sectional shape with both ends open in a longitudinal direction of the flow path forming member.

18. The battery device of claim 17, wherein the flow path forming member is divided into a first flow path member and a second flow path member, and
each of the first flow path member and the second flow path member includes the inlet, the first flow path, the second flow path, and the outlet.

19. A battery device comprising:
a cell assembly in which a plurality of battery cells are grouped; and
a frame member having a bottom member, a cover member, and a side member connecting the bottom member and the cover member to form an accommodating space for accommodating the at least one cell assembly therein,
wherein the frame member has a flow space in which the gas or flames generated in the cell assembly flow, and a venting hole connected to the flow space and discharging gas externally,
the flow space includes a first flow path formed in one of the cover member and the bottom member and connected to the accommodating space through an inlet, and a second flow path formed in the side member and connected to the first flow path and the venting hole,
the side member includes side wall members coupled to both ends of the cover member or both ends of the bottom member, and end plates covering both ends of the accommodating space formed by the cover member, the bottom member, and the side wall members, any one of the cover member and the bottom member is coupled to the side wall members to form a flow path forming member having the flow space through which the gas or flames generated in the cell assembly flow, each of the side wall members is integrally formed with at least a part of the cover member or at least a part of the bottom member to form the flow path forming member, and the flow path forming member has a constant cross-sectional shape with both ends open in a longitudinal direction of the flow path forming member.

\* \* \* \* \*